United States Patent [19]

Gunesin

[11] Patent Number: 4,539,371
[45] Date of Patent: Sep. 3, 1985

[54] HIGH IMPACT POLY(P-METHYLSTYRENE) POLYMERS

[75] Inventor: Binnur Z. Gunesin, Warren, N.J.

[73] Assignee: Mobil Oil Corporation, New York, N.Y.

[21] Appl. No.: 566,984

[22] Filed: Dec. 30, 1983

[51] Int. Cl.³ .............................................. C08L 53/02
[52] U.S. Cl. ........................................ 525/98; 428/35; 525/146; 525/177; 525/221; 525/240
[58] Field of Search ................. 525/98, 221, 227, 240, 525/177, 146, 314, 232

[56] References Cited

U.S. PATENT DOCUMENTS

| 4,205,114 | 5/1980 | Canterino et al. | 428/315 |
| 4,260,694 | 4/1981 | Schwab | 525/314 |
| 4,275,179 | 6/1981 | Sherman | 525/98 |
| 4,335,181 | 6/1982 | Maramo, Jr. et al. | 428/483 |
| 4,351,889 | 9/1982 | Sundberg | 429/141 |
| 4,352,908 | 10/1982 | Murray | 525/98 |
| 4,397,988 | 8/1983 | Sherman | 525/98 |

FOREIGN PATENT DOCUMENTS 1132746 9/1982 Canada ................................ 525/241

Primary Examiner—Christopher A. Henderson
Attorney, Agent, or Firm—Alexander J. McKillop; Michael G. Gilman; Charles J. Speciale

[57] ABSTRACT

The present invention provides a method for improving the environmental stress crack resistance of high impact poly(p-methylstyrene) by blending high impact poly(p-methylstyrene) with an additive copolymer having a higher environmental stress crack resistance. The invention further provides a shaped container resistant to fats.

6 Claims, No Drawings

HIGH IMPACT POLY(P-METHYLSTYRENE) POLYMERS

BACKGROUND OF THE INVENTION

1. Field of the Invention

The present invention is directed to blends of high impact poly(p-methylstyrene) (HIPPMS), and particularly to blends of HIPPMS and a copolymer which impart higher environmental stress crack resistance to fats and fat-containing foods on the resulting polymer.

2. Description of Prior Art

It is well known in the art to produce various shaped articles from foamed and unfoamed polymer sheets by thermoforming methods. Such articles may be used as containers for packaging foods.

It is also known to blend HIPPMS with other polymers. For example, it has previously been disclosed to blend HIPPMS and polystyrene with conjugated polydienes (U.S. Pat. No. 4,352,908), a conjugated diene, such as isoprene or butadiene (U.S. Pat. Nos. 4,260,694 and 4,397,988), or a styrene-conjugated diolefin block copolymer such as styrene-butadiene-styrene (U.S. Pat. No. 4,275,179). The above-mentioned references are incorporated herein by reference. The general purpose of these blends is to create a stronger, more heat resistance product. However, due to the structure of the HIPPMS polymer, containers made from HIPPMS are melted by hot fats and fatty acids and thus cannot be used to package fat-containing foods that are to be heated. It has been discovered that containers made from HIPPMS will become resistant to hot fats when treated by radiation (U.S. Pat. No. 4,205,114). However, until now it has not been known how to form non-radiated HIPPMS containers which may hold fat-containing foods without the above-mentioned adverse effects.

Surprisingly, it has been found that containers made from blends of HIPPMS and an additive polymer having higher than normal environmental stress crack resistance (ESCR) are resistant to the deleterious effects of fat-containing foods and fatty acids.

SUMMARY OF THE INVENTION

The present invention provides a method for improving the ESCR of HIPPMS by blending HIPPMS with an additive copolymer having a higher ESCR than HIPPMS. The present invention further provides a method of producing shaped containers which are resistant to hot fats and fatty acids. Additionally, the present invention provides a shaped container resistant to fats and fatty acids, which container comprises a blend of HIPPMS and an additive copolymer having a higher ESCR than HIPPMS.

DETAILED DESCRIPTION OF THE INVENTION

An essential copolymer in preparing the polymers used in this invention is high impact poly(p-methylstyrene). These are generally graft copolymers, produced by grafting units derived from the polymerizable mixture onto a backbone polymer which is generally of a rubbery nature. Suitable backbone polymers include polybutadiene, poly(dimethyl-butadiene), polyisoprene, polychloroprene and other synthetic rubbers, such as styrene-butadiene rubbers, ethylene-propylene-diene elastomers, polyacrylates, nitrile rubbers and copolymers with other aromatic monomers, including vinyl toluene. The backbone will generally comprise 2-25% by weight of the high impact copolymer, preferably 3-10% by weight. Normal techniques, e.g., grafting, comparable to those used for making high impact polystyrenes, are useful; they are well known in the art and referred to, for example, in U.S. Pat. No. 2,694,692.

The other blend component necessary for the production of the polymers in this invention is an additive polymer which, after blending, must impart a higher ESCR to the final product. Briefly, ESCR is a standard laboratory method for measuring the resistance of a strand of polymer to tensile pressure after the area of highest stress concentration (generally the center point) of the strand has been exposed to an oil environment. Representative oils include butter, margarine, cottonseed oil or salad oil.

It is within the scope of this invention to use a variety of additive polymers having higher ESCR qualities than HIPPMS. Representative examples include linear low density polyethylene, polypropylene, polycarbonate, Ethylene Methylacrylate Acrylic Acid (Surlyn), polyethylene teraphalate glycol (PETG), polystyrene-polybutadiene diblock, and polybutadiene-polymethylstyrene diblock.

Because the primary concern of the present invention is in the improvement of the ESCR of HIPPMS and not to form a completely new copolymer product, it is not within the scope to drastically alter the HIPPMS matrix. Therefore, the additive copolymer is added in an amount no more than 10 weight %, and preferably no more than 5 weight %, of the entire volume of the HIPPMS copolymer. In this manner, the additive copolymer will beneficially affect the HIPPMS container while not disrupting the continuous matrix characteristic of HIPPMS.

Although not necessary, it is preferable to use additive copolymers having a lower surface free energy than HIPPMS. The additive copolymer will diffuse to the surface of HIPPMS and form a thin layer coating, thus preventing fatty acids from penetrating and destroying the integrity of the formed productcontainer. Therefore, the additive copolymer will act as a surface protection. It is also within the scope of this invention to merely add a coating of additive copolymer to a HIPPMS container. However, it is preferable to blend the two copolymers together.

Blending of the polymers is accomplished by procedures well known in the art, including mixing the polymers in a Brabender mixer, extruder or in a Farrel two-roll differential speed mixer. The blend temperature falls within the range of 150°–250° C., preferably 200° C. Although HIPPMS and the additive copolymer may be blended simultaneously, it is preferred to preblend the HIPPMS for approximately five minutes and then add the additive copolymer. This latter method enhances the "adhesive" properties between HIPPMS and the additive copolymer, thus creating greater interfacial adhesion between the polymers. The additive copolymer is then blended into the melt-sheeted HIPPMS in a slow-feed or trickle-feed process. The trickle-feed process is to ensure that the additive copolymer is completely and thoroughly blended into HIPPMS. After the additive copolymer is completely added, the blending process continues for another ten minutes, again in order to ensure complete blending of the two copolymers. The product blend is then removed from the mixer, cooled to room temperature and pelletized.

The blends of the present invention exhibit high impact strength and resistance to fats and fatty acids.

The blends are particularly suited for applications in which high impact poly(p-methylstyrene) is used. These blends may be thermoformed to produce shaped articles well known to those skilled in the art. A generally preferred method of thermoforming is vacuum forming. Shaped articles produced by thermoforming the product blend sheet can vary widely. Typical shapes include trays, tubs, bowls, cups, and the like. Such shaped articles are adaptable for packing foods, and especially fat-containing foods.

The following examples are given in order that the invention may be more fully understood. Proportions and percentages are given by weight.

EXAMPLES 1 AND 2

The ESCR in these examples were tested by providing the point of greatest stress on the polymer strands with mixtures of hydrogenated fatty acids. For these examples, Chiffon brand margarine (trademark) was used. The polymers were then tested at 1,076 pounds per square inch (psi). Example 1 consisted of a control HIPPMS without a blend polymer. Example 2 consisted of blend of 90 weight % HIPPMS and 10 weight % linear low density polyethylene (GP2). Measurements were made of the fail time, i.e., the time required in minutes for pressure at 1,076 psi to snap each polymer strand.

The measurements of the resultant blends were as follows:

| Example | Blend | Fail Time (Minutes) |
|---|---|---|
| 1 | HIPPMS (R35B1) (Control) | 13.9 |
| 2 | HIPPMS (90 wt. %)/ LLDPE (10 wt. %) | 49 |

EXAMPLES 3-11

These blends were prepared by using the same method of Examples 1 and 2, with the exceptions that the fatty acids consisted of a mixture of 80 weight % cottonseed oil and 20 weight % oleic acid and the tensile strength was measured at 600 psi. The fail times of the resultant blends were as follows:

| Example | Blend | Fail Time (Minutes) |
|---|---|---|
| 3 | HIPPMS (R35B1) (Control) | 44 |
| 4 | HIPPMS (90 wt. %) LLDPE (10 wt. %) (GP2) | 148 |
| 5 | HIPPMS (90 wt. %) Polycarbonate (10 wt. %) (Lexan - Trademark) | 99.2 |
| 6 | HIPPMS (90 wt. %) Ethylene Methylacrylate Acrylic Acid (10 wt. %) (NA—Surlyn - Trademark DuPont) | 89.4 |
| 7 | HIPPMS (95 wt. %) Polyethylene teraphthalate glycol (5 wt. %) (PETG - TRADEMARK Eastman Kodak) | 99.3 |
| 8 | HIPPMS (95 wt. %) Polystyrene (40 wt. %) - Polybutadiene diblock (60 wt. %) (5 wt. %) (Solprene - Trademark) Phillips Petroleum Co.) | 229 |
| 9 | HIPPMS (95 wt. %) Polystyrene (30 wt. %) - Polybutadiene diblock (70 wt. %) (5 wt. %) (Stereon 870 - Trademark Firestone) | 210 |
| 10 | HIPPMS (95 wt. %) Butadiene/Paramethylstyrene diblock copolymer (5 wt. %) | 147 |
| 11 | HIPPMS (90 wt. %) Ethylene Methylacrylate Acrylic Acid (10 wt. %) ZN—Surlyn 9520 - Trademark DuPont) | 102 |

The results of Examples 1–11 indicate that the addition of an additive copolymer, having higher ESCR qualities than HIPPMS, increases the ESCR of the HIPPMS copolymer, thus yielding a high impact polymer with greater tensile strength and increased resistance to fats and fat-containing foods.

Although the present invention has been described with preferred embodiments, it is to be understood that modification and variations may be resorted to, without departing from the spirit and scope of this invention, as those skilled in the art will readily understand.

I claim:

1. A method of improving the environmental stress crack resistance of high impact poly(p-methylstyrene), comprising
    (a) melting said high impact poly(p-methylstyrene) at a temperature between 150° and 250° C.;
    (b) blending an additive copolymer with said melted high impact poly(p-methylstyrene) capable of imparting a higher environmental stress crack resistance to the final blend of said high impact poly(p-methylstyrene) and said additive copolymer, said additive copolymer being selected from the group comprising linear low density polyethylene, polypropylene, polycarbonate, ethylene methylacrylate acrylic acid terpolymer, polyethylene teraphalate glycol, polystyrene-polybutadiene diblock, and budadiene-paramethylstyrene diblock, said blending occurring at a temperature between 150° and 250° C.

2. The method according to claim 1, wherein said blending continues for ten minutes after said additive copolymer is completely added.

3. The method according to claim 1, wherein said additive copolymer is trickle-fed into said melted high impact poly(p-methylstyrene).

4. The method according to claim 2, further comprising cooling to room temperature and pelletizing the product of step (b).

5. The method according to claim 1, wherein said additive copolymer is blended in an amount no more than 10 weight % of the entire blend.

6. The method according to claim 1, wherein said additive copolymer is blended in an amount no more than 5 weight % of the entire blend.

* * * * *